United States Patent Office.

SMITH T. HARDING, OF MORRISON, ILLINOIS.

Letters Patent No. 68,069, dated August 27, 1867.

IMPROVED COMPOUND FOR PRESERVING WOOD.

*The Schedule referred to in these Letters Patent and making part of the same.*

TO ALL WHOM IT MAY CONCERN:

Be it known that I, SMITH T. HARDING, of Morrison, in the State of Illinois, have invented certain new and useful Improvements in the Process of Kyanizing Wood; and I hereby declare that the following is a true, full, and exact description of the same.

The kyanizer is compounded of the following ingredients proportioned by weight:

Take of calcined lime, (carbonate,) twelve parts; arsenious acid, four parts; chloride of sodium, (common salt,) six parts; sulphate of lime, (gypsum,) twelve parts.

*Mode of Preparation.*

To one pound avoirdupois of the above compound add eight gallons (wine measure) water, immerse the wood in said mixture, agitating occasionally, for ten days, when it will be ready for use.

Wood saturated with the above compound will be made harder and resist decaying influences much more effectually than in its natural state.

Having thus described my invention, what I claim, and desire to secure by Letters Patent, is—

A compound, composed of the within-named ingredients, in or about the proportions as set forth, for the purpose of kyanizing wood, substantially as herein described.

SMITH T. HARDING.

Witnesses:
    CYRUS O. PECK,
    GEO. H. FORY.